United States Patent [19]
Dockery

[11] 3,738,491
[45] June 12, 1973

[54] UNDER-GRAVEL AQUARIUM FILTER

[76] Inventor: Denzel J. Dockery, G-4142 Fenton Road, Flint, Mich. 48507

[22] Filed: Sept. 29, 1971

[21] Appl. No.: 184,870

[52] U.S. Cl. ............................................. 210/169
[51] Int. Cl. ................................................ E04h 3/20
[58] Field of Search .................................... 210/169

[56] References Cited
UNITED STATES PATENTS

| | | | |
|---|---|---|---|
| 3,135,238 | 6/1964 | Eyl | 210/169 X |
| 3,362,537 | 1/1968 | Cline | 210/169 |
| 3,516,544 | 6/1970 | Sesholtz | 210/169 |
| 3,624,777 | 11/1971 | Gardner | 210/169 |

*Primary Examiner*—Samih N. Zaharna
*Assistant Examiner*—T. A. Granger
*Attorney*—Robert C. Hauke, Ernest I. Gifford and Claude A. Patalidis et al.

[57] ABSTRACT

An improved means of filtering and circulating the water in an aquarium wherein gravel at the bottom of the aquarium is effectively employed to trap the waste material and debris so that it can be eliminated by natural decay or by backwashing of the gravel.

4 Claims, 3 Drawing Figures

PATENTED JUN 12 1973        3,738,491
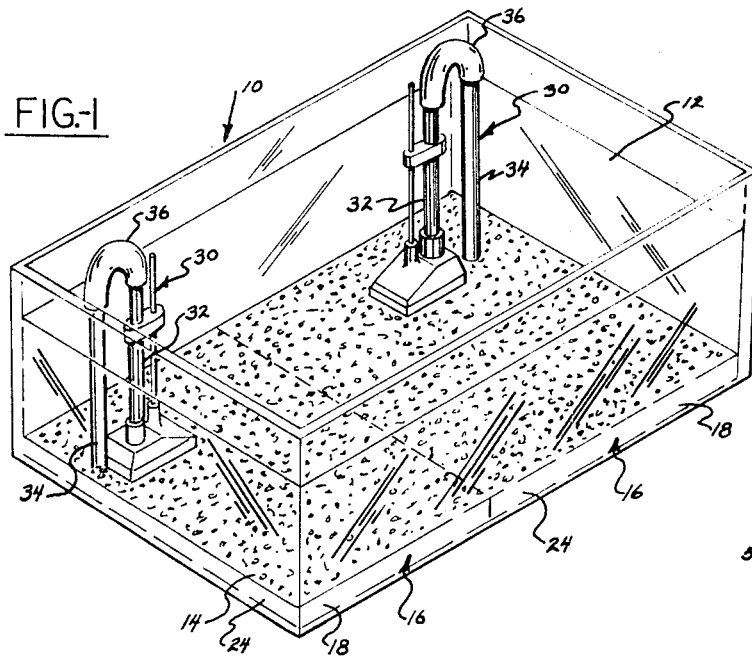
FIG.-1
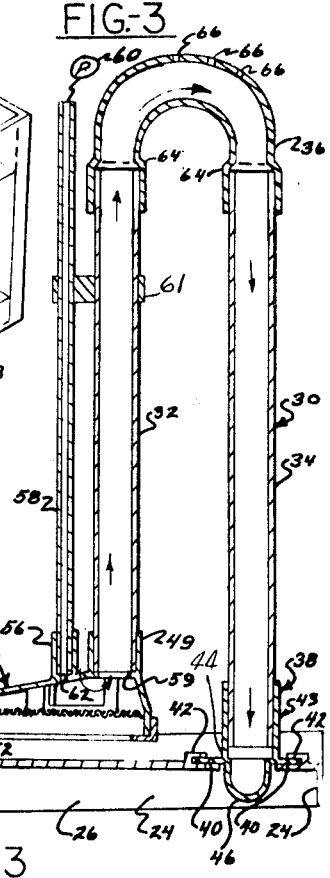
FIG.-3
FIG.-2
INVENTOR
DENZEL J. DOCKERY
BY
Hauke Gifford & Patalidis
Attorneys

UNDER-GRAVEL AQUARIUM FILTER

BACKGROUND OF THE INVENTION

The invention relates to water filtering and circulating systems for aquariums, and more particularly to such a system in which the waste material is trapped between the gravel and the bottom of the aquarium where it can be eliminated by decay or backwashing.

Aquarium systems in present use employ gravel at the bottom of the tank as a filter for the water circulation system. A suction pump draws the water from a chamber beneath the gravel so that the water is drawn from the tank downwardly through the gravel. The water taken from the chamber beneath the gravel is directed to an external filter and purifier and is then returned to the top of the tank. Waste material and debris removed from the water by the gravel is eliminated by decay within the gravel. Removal of excess waste material requires washing of the gravel and this is only accomplished by removal of the gravel.

Because water flow is from the top of the gravel downward, the septic line produced by the decaying impurities and sediment tends to remain near the top surface where if uncovered or if the waste material occurs in too great amounts to decay properly the waste material can contaminate the whole tank.

The present invention avoids the disadvantages of these systems primarily by reversing the direction of the water flow through the gravel so that instead of flowing downwardly through the gravel, water flows from below the gravel upwardly. In this way, the septic line tends to remain near the bottom of the gravel where the waste materials can decay with less toxic effect on the aquarium and where the septic line is less apt to be accidentally uncovered. Also because the normal flow is upwardly through the gravel, backwashing will be downwardly through the gravel to direct the waste material out of the tank and not into the water contained in the tank. Thus, backwashing in the present system can be used and it should never be necessary to remove the contents of the tank to clean the gravel.

SUMMARY OF THE INVENTION

The system of the present invention comprises a grid which is placed on the bottom of the tank. The grid is formed with a downwardly extending peripheral portion so that a chamber is formed between the underside of the grid and the bottom of the tank. The gravel is disposed on the grid.

The water circulation is achieved by means of a tower mounted into the grid at the corner and comprising a U-tube and a collector head mounted at the free end of the U-tube in a position spaced upwardly from the grid. An air tube is mounted to the collector head and exhaust openings are provided in the U-tube so that actuating a pump connected to the air tube causes water to be drawn from the tank above the gravel and to be directed through a distributor and into the chamber between the bottom of the aquarium and the grid. In this way waste material normally collecting on the upper surface of the gravel is drawn off by the collector head and is deposited in the chamber at the bottom of the aquarium. The material is then broken up by the grid and is drawn up into the lower portion of the gravel where it forms a septic line and decays without disturbing the contents of the tank.

If the waste material becomes excessive either in the chamber or along the lower surface of the gravel, backwashing is easily accomplished. A section of the U-tube is removed and the distributor side of the U-tube is connected to a suction or syphon apparatus. The water is drawn from the chamber below the gravel up into the distributor leg and out of the tank, where it can be discharged. This is easily accomplished without disturbing the contents of the tank.

It can be seen, then, that the present invention provides an improved circulation and filtration system for an aquarium by providing a system in which the gravel acts as a barrier between the waste material and the clean water in the tank.

There are other advantages to the present system as well. Gases produced by the decaying matter at the septic line will tend to be carried off by reason of the upward flow of water through the gravel bed. Many aquarium specimens like to root in the aquarium bed and this rooting will not disturb a septic line located near the bottom of the gravel.

Systems presently in use draw water from below the gravel up into a circulating tower, where it is filtered or purified before being pumped back into the tank. Drawing the water from below the gravel means, of course, that the water from the tank moves down into the gravel, which thereby becomes an initial filter for particles and other matter which cannot pass through it. In effect, in such systems, the dirty side of the gravel filter is the tank itself, whereas in the present invention the water from the tank can be filtered and purified in a filter provided in the U-tube element before it even passes to the gravel. With or without an initial filter in the U-tube the dirty side of the gravel filter in the present invention is the area below the gravel and not the tank itself.

DESCRIPTION OF THE DRAWINGS

The present invention will become clearer upon reference to the following description. The description refers to the accompanying drawings in which like reference characters refer to like parts throughout the several views and in which:

FIG. 1 is a perspective view of a typical aquarium utilizing the system of the present invention;

FIG. 2 is a plan view of a grid and a fluid circulating tower of the present invention; and FIG. 3 is a cross-sectional view taken substantially along line 3—3 of FIG. 2.

DESCRIPTION OF A PREFERRED EMBODIMENT

Now referring to the drawings for a description of a preferred embodiment of the present invention, FIG. 1 illustrates an aquarium 10 of conventional form constructed to contain water 12 and aquarium specimens (not shown). Gravel 14 is provided for the aquarium and two circulating assemblies 16 are contained within the aquarium 10. The circulating assemblies 16 are mirror images of each other and each comprises a metal or plastic grid 18 which together occupy the entire bottom of the aquarium 10. The gravel 14 is disposed on top of the grids 18.

As can best be seen in FIGS. 2-3, each of the grids 18 is provided with a plurality of closely spaced longitudinal slits 20 separated in groups by a plurality of support ribs 22 extending parallel with the slits 20 and upwardly from the upper face of the grid 18. The support ribs 22 then not only provide strength for the grid 18 but also aid in retaining the gravel in position on the upper surface of the grids 18. As can best be seen in FIG. 3, each of the grips 18 is provided with peripherally disposed side members 24 which support the grids 18 above the floor of the aquarium 10 to define a chamber 26. Legs 28 (FIG. 2) extending downwardly from the grid 18 provide support for the center sections of the grid 18.

As can best be seen in FIG. 3, each of the circulating assemblies 16 further comprises a circulating tower 30 extending upwardly from one corner of the grid 18. As shown in FIG. 1, the circulating towers 30 are positioned at the same end but in opposite corners of the grids 18 so that when two circulating assemblies 16 are mounted in a single aquarium as is generally done especially with larger aquariums, the circulating towers 30 will be positioned in the corners of the aquarium 10.

Each of the circulating towers 30 preferably comprises vertically extending tubes 32 and 34 connected together by a U-shaped tube 36. The tube 34 is mounted at its free end to a distributor head 38 (FIG. 3) which in turn is mounted to the grid 18 by peripheral segmented flanges 40 which are adapted to be rotated to a position beneath clamp members 42 mounted to and spaced upwardly from the grid 18. The distributor head 38 is provided with a socket 43 for receiving the end of the tube 34. The distributor head 38 extends through an opening 44 in the grid 18 so that a screened outlet member 46 is positioned within the chamber 26.

A collector head 48 is mounted to the free end of the tube 32 and comprises a generally flat screened inlet positioned above and generally parallel to the upper surface of the grid 18. The collector head 48 includes an upwardly extending socket 49 for receiving the free end of the tube 32. The inlet of the collector head 48 is defined by an enlarged open end 50, a centrally open cap member 52 mounted on the open end 50 of the collector head 48, and a screen 54 mounted within the collector head 48 between the cap member 52 and the end of the tube 32. The tube 32 communicates with the interior of the collector head 48 through an opening 55.

A socket 56 is formed in the collector head 48 extending upwardly adjacent the socket 49 for receiving the end of an air tube 58. The air tube 58 extends upwardly from the collector head 48 adjacent the tube 32 and a clamp 60 is provided for clamping the air tube 58 to the tube 32 as shown. The upper end of the air tube 58 is adapted to be connected to an air pump 60, while the lower end registers with the interior of the collector head 48 through an opening 62 adjacent the opening 59.

The U-shaped tube 36 is adapted to telescopically receive the ends of the tubes 32 and 34 and internal shoulders 64 limit movement of the tubes 32 and 34 into the U-shaped tube 36. Vent openings 66 are provided in the upper portion.

With the top of the air tube 58 connected to the air pump 60, air under pressure is directed downwardly through the tube 58 and into the collector head 48. The air then moves upwardly through the tube 32, escaping to atmosphere through the vent openings 66. The movement of the air through the collector head 48 produces a venturi effect at the inlet, which draws water from the aquarium into the collector head 48 and up into the tube 32. When the air has escaped through the vent openings 66, the water will continue to move by inertia and by gravity into the tube 34 and through the distributor head 38 into the chamber 26 beneath the grid 18.

The position of the collector heads 48 is such that the entire surface of the gravel in the bottom of the aquarium 10 will be swept clean as the water is drawn into the collector heads 48. Water will also be drawn from the chamber 26 through the slits 20 formed in the grids 18. Circulation through the gravel in this manner tends to keep the gravel loose, preventing it from compacting and insuring that foreign matter, such as fish droppings and excess food, will not become embedded in the gravel but will be drawn into the collector heads 48.

To aid in promoting a good circulation through the gravel, the grid 18 is slanted upwardly away from the collector head 48 slightly, as can best be seen in FIG. 3. This means that with the top of the gravel level, the bed of gravel will be of decreasing depth in proportion to the distance away from the collector head 48. Since less suction will be produced in those areas away from the collector head 48, the decreased resistance to water flow produced by the reduced depth of gravel will tend to promote an even collection of water and waste material throughout the bottom of the aquarium.

The waste material and debris picked up by the collector heads 48 will be broken up as it successively passes through the screened inlet of the collector head 48, the screened outlet member 46 of the distributor head 38 and the slits 20 of the grid 18 so that by the time it passes through the grid 18 the waste material will be in the form of rather small particles. These will lodge in the gravel near the upper surface of the grid to form a septic line where the particles can be readily attacked and broken up by bacteria.

Because the septic line is well beneath the gravel and not near the upper surface of the gravel as in most aquarium circulating systems, it is less susceptible to being accidentally disturbed. Gases released as the bacteria is breaking up the waste material will flow upwardly through the gravel and will be picked up by the collector head before they can flow into the tank of the aquarium. In general, the present system provides a more efficient filtration system and a cleaner appearing aquarium than heretofore possible.

As sometimes happens, the waste material might accumulate at a rate which cannot be handled by any septic type filtration system. Heretofore when this happened, it was necessary to remove the entire contents of the aquarium to clean the gravel. Further, this had to be done rather quickly before the waste material could contaminate the water in the aquarium. In the system of the present invention, when this happens it is very easily remedied. First, the urgency is not as great because instead of being on top of the gravel and thus in a position to contaminate the water, in the present system such waste material will be in the chamber 26 separated from the rest of the water in the aquarium by the grid 18 and the gravel 14. Secondly, backwashing to completely remove such waste material from the system can be readily performed. All that is necessary is to lift the U-shaped tube 36 from the ends of the tubes 32 and 34. A suction pump is then connected to the tube 34 and the water is drawn from the chamber 26, bringing with it the waste matter accumulated in the chamber 26 and along the lower surface of the gravel. This backwashing can be done without disturbing the contents of the aquarium.

As can best be seen in FIGS. 2 and 3, the circulating towers 30 can be readily removed from the grids 18 for packaging or storage when not in use. The collector head 48, the tubes 32, 34, the U-shaped tube 36 and the distributor head 38 are all attached to each other in a manner which permits them to be separated from each other. The distributor head 38 can be removed from the grid 18 by rotating it about its axis about 45° to bring the flanges 40 from beneath the clamps 42. The clamping arrangement between the distributor head 38 and the grid 18, while providing for easy separation still provides a means for securely mounting the circulation towers 30 in place.

It is apparent that although a system has been described utilizing two circulating assemblies 16 in some aquariums only one will be necessary, while in others it might be desirable to use more than two.

While only one preferred embodiment of the present invention has been described, it is also apparent that numerous changes and modifications can be made without departing from the spirit of the invention.

I claim:

1. A circulating system for an aquarium having water and a material such as gravel on the bottom of the aquarium said system comprising:

a grid disposed upwardly from the bottom of the aquarium to form a chamber between the bottom of said aquarium and the underside of said grid, said material being disposed on said grid;

said chamber communicating with the water in said aquarium through said grid and through said material;

means collecting water from the upper surface of said material and directing it into said chamber;

said collecting means comprising a collector head having a flat inlet disposed above the material on said grid in close proximity thereto, said flat inlet being disposed generally parallel to the upper surface of the grid; and said collecting means further comprising means for conducting water through said grid and from the upper surface of said material, through said inlet, and into said chamber under said grid.

2. The system as defined in claim 1 and in which said grid is slanted downwardly from a horizontal plane in a direction toward said collector device.

3. The system as defined in claim 1 and in which said conducting means comprises an air pump and means for connecting said air pump to said collector head, generally vertically extending tubes with one of said tubes connected with said collector head and means mounting the other of said tubes to said grid and opening to said chamber, a removable U-shaped tube connecting the upper ends of said tubes, and vent openings in said U-shaped tube.

4. The system as defined in claim 3 and in which said mounting means comprises circumferentially spaced flange portions connected with said tube and spaced clamping means spaced upwardly from said grid for receiving said flange portions upon rotation of said flange portions.

* * * * *